United States Patent [19]

Porter et al.

[11] Patent Number: 4,471,429
[45] Date of Patent: Sep. 11, 1984

[54] APPARATUS FOR CACHE CLEARING

[75] Inventors: Marion G. Porter; Charles P. Ryan; James L. King, all of Phoenix, Ariz.

[73] Assignee: Honeywell Information Systems, Inc., Waltham, Mass.

[21] Appl. No.: 342,370

[22] Filed: Jan. 25, 1982

Related U.S. Application Data

[63] Continuation of Ser. No. 103,804, Dec. 14, 1979, abandoned.

[51] Int. Cl.³ .............................................. G06F 13/00
[52] U.S. Cl. ................................................... 364/200
[58] Field of Search ............................... 364/200, 900

[56] References Cited

U.S. PATENT DOCUMENTS

| | | | |
|---|---|---|---|
| 3,735,360 | 8/1973 | Anderson | 364/200 |
| 3,845,474 | 10/1974 | Lange | 364/200 |
| 3,979,726 | 9/1976 | Lange | 364/200 |
| 4,056,844 | 11/1977 | Izumi | 364/200 |
| 4,078,254 | 3/1978 | Beausoleil | 364/900 |
| 4,177,510 | 12/1979 | Appell | 364/200 |

Primary Examiner—Harvey E. Springborn
Assistant Examiner—David Y. Eng
Attorney, Agent, or Firm—Finnegan, Henderson, Farabow, Garrett & Dunner

[57] ABSTRACT

A cache clearing apparatus for a multiprocessor data processing system having a cache unit and a duplicate directory associated with each processor. The duplicate directory, which reflects the contents of the cache directory within its associated cache unit, and the cache directory are connected through a system controller unit. Commands affecting information segments within the main memory are transferred by the system controller unit to each of the duplicate directories to determine if the information segment affected is stored in the cache memory of its associated cache memory. If the information segment is stored therein the duplicate directory issues a clear command through the system controller to clear the information segment from the associated cache unit.

6 Claims, 5 Drawing Figures

APPARATUS FOR CACHE CLEARING

This is a continuation of application Ser. No. 103,804, filed Dec. 14, 1979, now abandoned.

BACKGROUND OF THE INVENTION

1. Field of the Invention. This invention relates to data processing systems and, more particularly, to data processing systems having multiple processors with each processor having a cache connected thereto and a duplicate directory associated with a system controller.

2. Description of the Prior Art. A cache is a small, generally high speed memory store unit (cache memory) and a directory for locating the information within the cache memory. The cache memory is generally of a higher order of speed than the main memory. Thus, if the information is stored in the cache memory, quicker access by the processor to the required information is possible. Further, the cache memory is generally a small fraction of the size of the main memory. Operands and instructions, hereinafter generically referred to as information segments or data, are either fetched from the main memory and stored into the cache memory or they are loaded directly from the central processing unit (hereinafter referred to as CPU). When the CPU requires information segments, the cache memory is accessed first. If the information segments are not present in the cache memory, then they are obtained by accessing the main memory. The accessed information segments provided by the memory and transferred to the processor can be stored into the cache as they are passed through the CPU.

Generally it is desirable that the main memory contain all of the information segments and that the cache memory only reflects what is in the main memory. Thus, if a peripheral device requests and has transferred to it the contents of a portion of the memory, and further clears the information segments as they are provided from the main memory, it is possible that the cache of one or more of the processors could contain data which is no longer present in the main memory.

Further, it is possible that one of the processors writes an information segment into a particular storage location within the main memory. The cache of another processor can contain the information segment which has just been replaced by the first processor. Therefore, it is possible that if the processor accesses that particular information segment present in its cache memory, it could act upon data which is no longer identical with the information segment in the main memory.

One type of cache clearing operation is to clear the entire cache of all the processors any time data was written into the main memory or cleared by a peripheral device. However, in the usual case, the majority of the information segments stored within the cache are not outputted to the peripheral device and it is likely that information segments just cleared will have to be retrieved again from the main memory. This type of arrangement is shown in U.S. Pat. No. 3,845,474 issued to Lange et al on Oct. 29, 1974 and entitled "Cache Store Clearing Operation for Multiprocessor Mode".

Many data processing systems utilize segmentation and paging of the memory. Each segment is usually divided into smaller sections referred to as pages. The pages correspond to particular storage locations within the cache memory. Thus, it is possible to construct a device which provides selected clearing of only certain memory locations, i.e., those associated with a particular page, if that particular page is effected by an input/output operation or by another processor. This type of operation and apparatus is shown in U.S. Pat. No. 3,979,726 issued to Lange et al on Sept. 7, 1976 and entitled "Apparatus for Selectively Clearing a Cache Store in a Processor Having Segmentation and Paging". Although in this particular apparatus, the entire cache memory is not cleared, the fact does remain that useful data within the cache memory can be erased if the data relates to the page which is effected. It would therefore be necessary to access those information segments from the main memory under subsequent operations of the CPU.

Neither of these prior constructions shows a selective cache clearing utilizing a duplicate directory which communicates with the cache directory through the system controller.

SUMMARY OF THE INVENTION

The present invention involves the cache clearing apparatus of a multiprocessor data processing system having a plurality of duplicate directories. Each duplicate directory is connected through a system controller unit to the cache of its corresponding processor. Each cache has a cache directory and a cache memory.

For the purposes of utilization of the address of a particular information segment within the main memory as an address tag for the cache, the main memory address is divided into an upper and lower portion. The lower portion comprises the least significant bits of the address and the upper portion the most significant bits of the address. The lower portion is utilized to address a set of address tags within the cache directory. The cache directory outputs all of the address tags within the set in parallel to a comparator. The address tags are compared with the upper portion of the address to determine if the information segment sought is stored within the cache memory.

If there is a match between the address tag and the upper portion of the main memory address, the particular information segment within the cache memory corresponding to the address tag of the set is selected. This is accomplished by assigning each address tag of the directory a level which corresponds to a level of the cache. For example, if the directory is organized such that there are eight levels, i.e., eight addressed tags which are address by the lower portion of the main memory address, the cache must have eight levels. The comparator receives the eight address tags so that it is aware of the level of each address tag. If a match between one of the address tags and the upper portion of the main memory address is found, the comparator outputs a signal indicating to the cache which of its eight levels should be selected as output.

The address tags are stored into the directory by having the lower portion of the main memory address selected as the address for the directory and upper portion of the main memory address present at the write inputs of the cache directory. The particular level is selected by a round robin counter (or any other standard method).

Also associated with each address tag is a bit which indicates the full/empty status of the corresponding storage location within the cache memory. If the full/empty bit is set, this indicates that the corresponding storage location within the cache memory contains a valid information segment which can be utilized by the CPU. If the full/empty bit is not set, the comparator does not indicate a match and does not select one of the levels within the cache memory even though the tag address for that level is identical with the upper portion of the main memory address. Thus, it is unnecessary to clear the entire address tag or utilize some other procedure to clear the cache memory. The full/empty bit of the cache directory is set when an information segment is written into the cache and the upper portion of the main memory address is written into the directory as an address tag along with the assigned level. Shown herein, the upper portion of the main memory address can only be written into the directory from the CPU. However, the full/empty bit can be accessed through a block clear instruction containing a lower portion of the address from the system controller unit.

The cache is connected through the system controller unit to the main memory and a duplicate directory. Each cache of the multiprocessor data processing system has one duplicate directory associated therewith. Each duplicate directory has storage locations which correspond to each storage location within the cache directory. The duplicate directory is capable of storing address tags and levels, and the associated full/empty bits. Each system controller unit is connected to each of the duplicate directories.

The duplicate directory receives the indications that a particular address tag has been written into the directory and the full/empty bit set indicating that the information segment within the cache memory is valid. The duplicate directory responds to this indication by storing the address tag at the same level and by setting its full/empty bit.

If, for example, another processor writes into a particular main memory location, the system controller associated therewith sends a signal to the other duplicate directory indicating the main memory address which is affected. Each duplicate directory examines its contents to determine if that particular address tag formed by the upper portion of the main memory address, as addressed into the duplicate directory by the lower portion of the main memory address, is present therein. If one of the address tags is determined to be the upper portion of the main memory address by comparison and the full/empty bit is set, the duplicate directory resets the full/empty bit to indicate that the information segment contained in the cache at the address is no longer valid. The directory then sends a clear signal to the directory of its associated cache. The clear signal contains the level and the lower portion of the main memory address. The level sent, of course, is the level that the address tag which corresponded to the upper portion of the main memory address was located. The clear signal also contains instructions to the cache that the full/empty bit of the address level must be reset to indicate that the information segment located in the cache is no longer valid.

The system control unit is also connected to various peripheral units which both transfer information segments to be stored in the main memory and receive information segments from the main memory for utilization by the peripheral devices. Peripheral devices are instructed through the system controller unit by one of the CPUs to read and clear a portion of the memory. Thus, the peripheral device through the system controller unit requests information segments from certain addresses within the main memory and clears the information segments contained therein.

The system controller unit, when a particular address within the main memory no longer contains a valid information segment because it has been cleared by the peripheral, sends the address of that cleared information segment and an indication that the address has been cleared to each of the duplicate directories. The duplicate directories then utilize the lower portion of the main memory address to access the appropriate set of address tags within the duplicate directory. The upper portion of the main memory address is compared with the address tags. If one of the address tags is identical with the upper portion of the main memory address and the full/empty bit is set (i.e., the cache contains a valid information segment), the full/empty bit within the directory associated with the particular address tag is reset to indicate that the cache memory does not contain a valid information segment. A clear signal is then sent to the cache and the full/empty bit of the cache directory is also reset as discussed above.

It is an object of this invention to provide a plurality of duplicate directories operating through a system controller which ensure that none of the caches contain information segments for certain memory locations that are different from the the information segments in those certain memory locations stored within the other caches.

It is a further object of this invention to provide plurality of duplicate directories which respond to information being read and cleared by peripheral devices through the system controller unit to ensure that if a location within the main memory is cleared by the peripheral device or overwritten, that the cache memory of the various central processing units contains only information segments which are currently stored within the main memory.

DESCRIPTION OF THE PREFERRED EMBODIMENT

Figure 1:
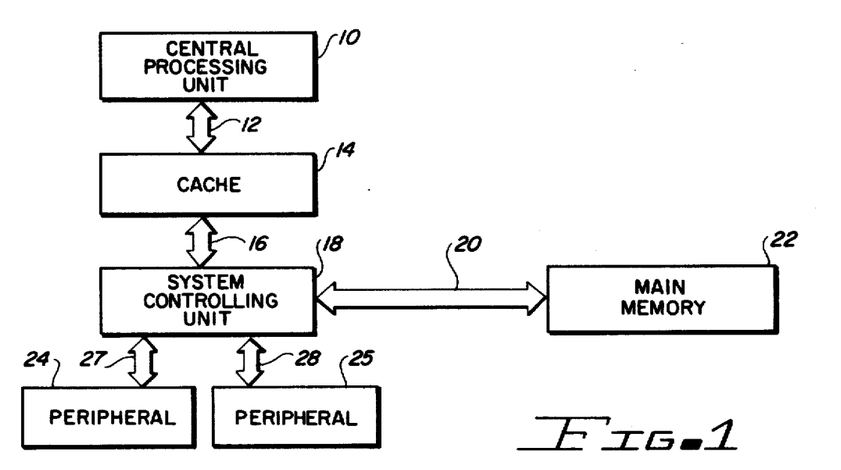
FIG. 1 is a block diagram showing the basic architecture of a data processing system.

With particular reference to FIG. 1, a central processing unit (hereinafter referred to as the CPU) 10 is shown connected through multiline channel 12 to a cache 14. Cache 14 is connected through multiline channel 16 to a system controller unit 18. The system controller unit 18 is connected through multiline channel 20 to a main memory 22. Peripheral devices 24 and 25 are connected through multiline channels 27 and 28, respectively, to system controller unit 18.

The central processing unit sends requests for information segments from the main memory 22. The central processing unit can also issue commands through multiline channel 12 that certain information segments be stored into the main memory 22. The request for information to be read and commands to write pass through the cache 14.

The read command generally initiates a search through the cache directory (not shown) utilizing the address which is provided by the central processing unit to a particular storage location within the main memory. This is done to determine if that information segment is present in the cache memory. If the information segment is present in the cache, the information segment is read from the cache memory and sent to the central processing unit through multiline channel 12. The request for the information segment from the main memory 22 is aborted. If the information segment is not present within the cache memory, as determined from the main memory address, the read request is passed through multiline channel 16 to the system controller 18 and through multiline channel 20 to main memory 22. The stored information segment is read utilizing the address provided by the central processing unit. The information segment read passes back through multiline channel 20, system controller 18, multiline channel 16, cache 14 and multiline channel 12 to the central processing unit 10. Generally the information segments from the main memory are stored into the cache memory within cache 14 so that if the central processing unit desires the utilization of those information segments during subsequent operations, they are available within the cache.

During a write command the information segments to be written into the main memory 22 pass through multiline channel 12, cache 14, channel 16, system controller unit 18, and channel 20. The central processing unit can provide that the information segments written into the main memory are also written into the cache memory (not shown) within cache 14. It should be noted that all of the information segments present within the cache memory are in traditional architecture also located within the main memory 22.

Peripheral devices 24 and 25 are capable of either receiving information segments from system controller 18 or providing information segments thereto or both. For example, if peripheral device 24 is providing information segments to be written in main memory 22, the information segments proceed through channel 27, system controller 18, and channel 20. If any of the information segments within main memory 22 are overwritten by information segments from peripheral 24, or if there is any possibility that this may occur, the cache memory within cache 14 must be cleared. At the very least, the information segments overwritten must be cleared. As discussed above in connection with the prior art, this has been accomplished by clearing the entire cache memory during a read operation from a peripheral device.

If, for example, peripheral device 25 is to read information segments from main memory 22 and cause those memory segments to be cleared, the information segments cleared from the main memory which are present within the cache memory must also be cleared. In the past, as discussed above, the cache memory within cache 14 was completely cleared and not just those information segments which were removed from the main memory that are present therein. It should be noted that one technique to clear the cache memory is to merely clear a full/empty bit located within the directory associated with the cache memory.

Figure 2:
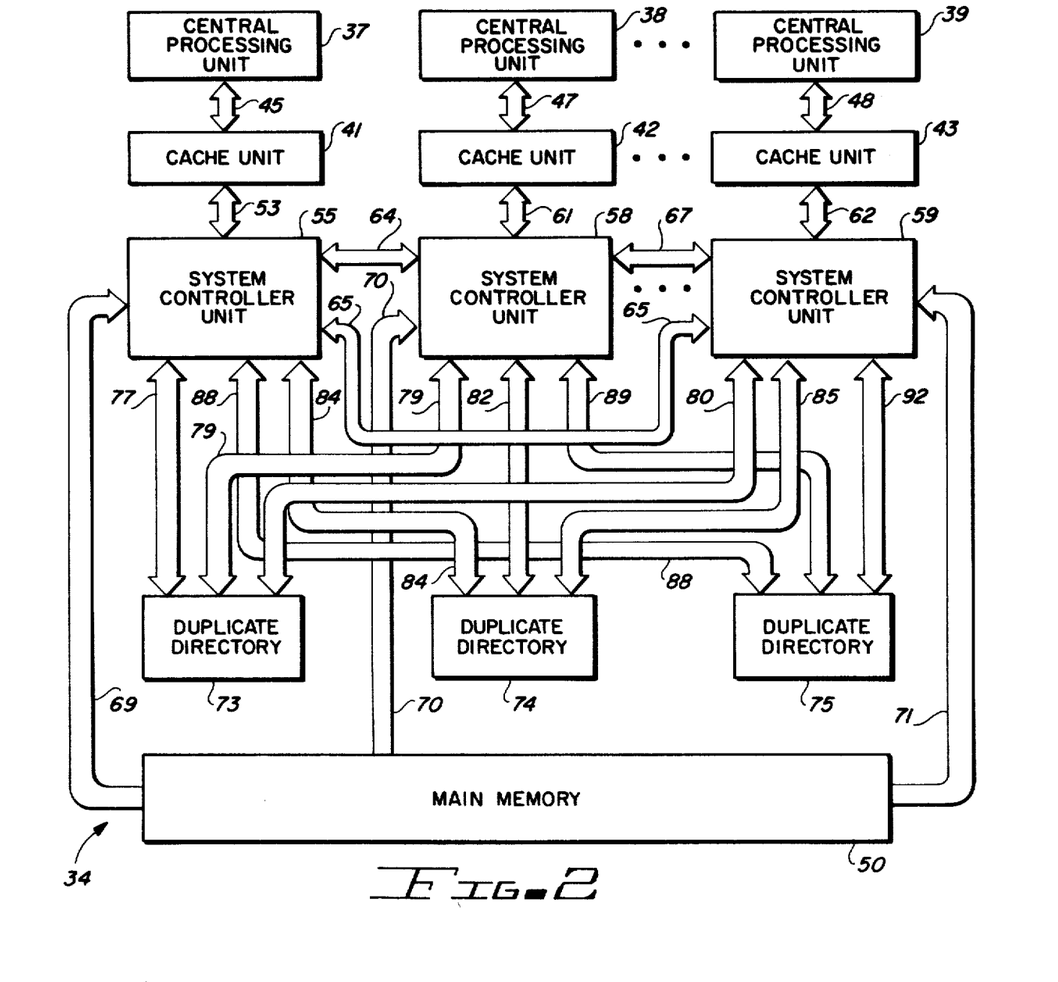
FIG. 2 is a block diagram of a multiprocessor of a processing system including cache memory units associated with each processor and a plurality of duplicate directories.

With particular reference to FIG. 2, a multiprocessor data processing system 34 utilizing the present invention is shown. Data processing system 34 is shown with central processing units (CPUs) 37 through 39. Although data processing system 34 is shown having three central processing units, the present invention is capable of being practiced wih only two central processing units. Any number of central processing units greater than two can be utilized with the present invention. Each of the central processing units 37 through 39 is connected to a cache unit 41 through 43, respectively. Central processing unit 37 is connected to cache unit 41 through multiline channel 45. Central processing units 38 and 39 are connected to their associated cache units 42 and 43 through multiline channels 47 and 48, respectively.

Through multiline channels 45, 47 and 48, the central processing units request information segments from the main memory 50 and command that certain information segments provided by the central processing unit be written into the main memory 50. The operation of the cache units 41 through 43 is discussed in detail herebelow in conjunction with FIG. 3. Cache unit 41 is connected through multiline channel 53 to a system controller unit 55. System controller units 58 and 59 are connected through multiline channels 61 and 62, respectively, to cache units 42 and 43, respectively. Although not shown in FIG. 2, the system controller units 55, 58 and 59 are also connected to peripheral devices (not shown) such as those peripheral devices 24 and 25, as shown in FIG. 1.

System controllers 55, 58, and 59 can be one system controller. One system controller can be adapted to service one or more central processing units. If more than 1 system controller is utilized, then each of the system controller units must be in electrical communication with all the remaining system controller units so that their activities can be properly co-ordinated.

System controller 55 is connected through multiline channels 64 and 65 to system controllers 58 and 59, respectively. It should be noted that all of the channels shown in FIG. 2 provide two-way communication for the units between which they are connected. System controller 58 is connected to system controller 59 through multiline channel 67.

System controllers 55, 58, and 59 are connected through multiline channel 69, 70 and 71, respectively, to main memory 50. Each cache unit 41 through 43 has one duplicate directory 73 through 75, respectively, associated therewith. Duplicate directory 73 is connected through multiline channel 77 to system controller unit 55. Directory 73 is also connected through multiline channels 79 and 80 to system controller units 58 and 59, respectively.

Duplicate directory 74 is connected to system controller 58 associated with cache unit 42 through multiline channel 82. The duplicate directory 74 is further connected through multiline channels 84 and 85 to system controller units 55 and 59, respectively.

Duplicate directory 75 is similarly connected through multiline channels 88 and 89 to system controller units 55 and 58, respectively. Duplicate directory 75 is also connected through multiline channel 92 to the system controller unit 59, which is connected to its associated cache unit 43.

The central processing units 37, 38, and 39 can request an information segment from memory 50 by providing an address to the particular memory location containing the desired information segments and a read command. The central processing units 37, 38, and 39 can also write information segments into main memory 50 by commanding the system controller units 55, 58, and 59, respectively, and by providing the address into which the particular information segment is to be written along with the information segment.

For example, central processing unit 37 requests information segments located at a particular address within the main memory through multiline channel 45, cache unit 41, channel 53, system controller 55, and channel 69. This read command indicates that the information segment at a particular address within the command is to be transferred to the central processing unit 37. The main memory 50 locates the information segment utilizing the address included with the read command and provides the information segments through channel 69, system controller unit 55, channel 53, cache 41, and channel 45 to central processing unit 37.

Read commands can also be issued by the peripherals connected to the system controller units 55, 58 and 59. The read commands can also clear information segments from the main memory after the information segments are transferred through the applicable system controller unit.

Figure 3:
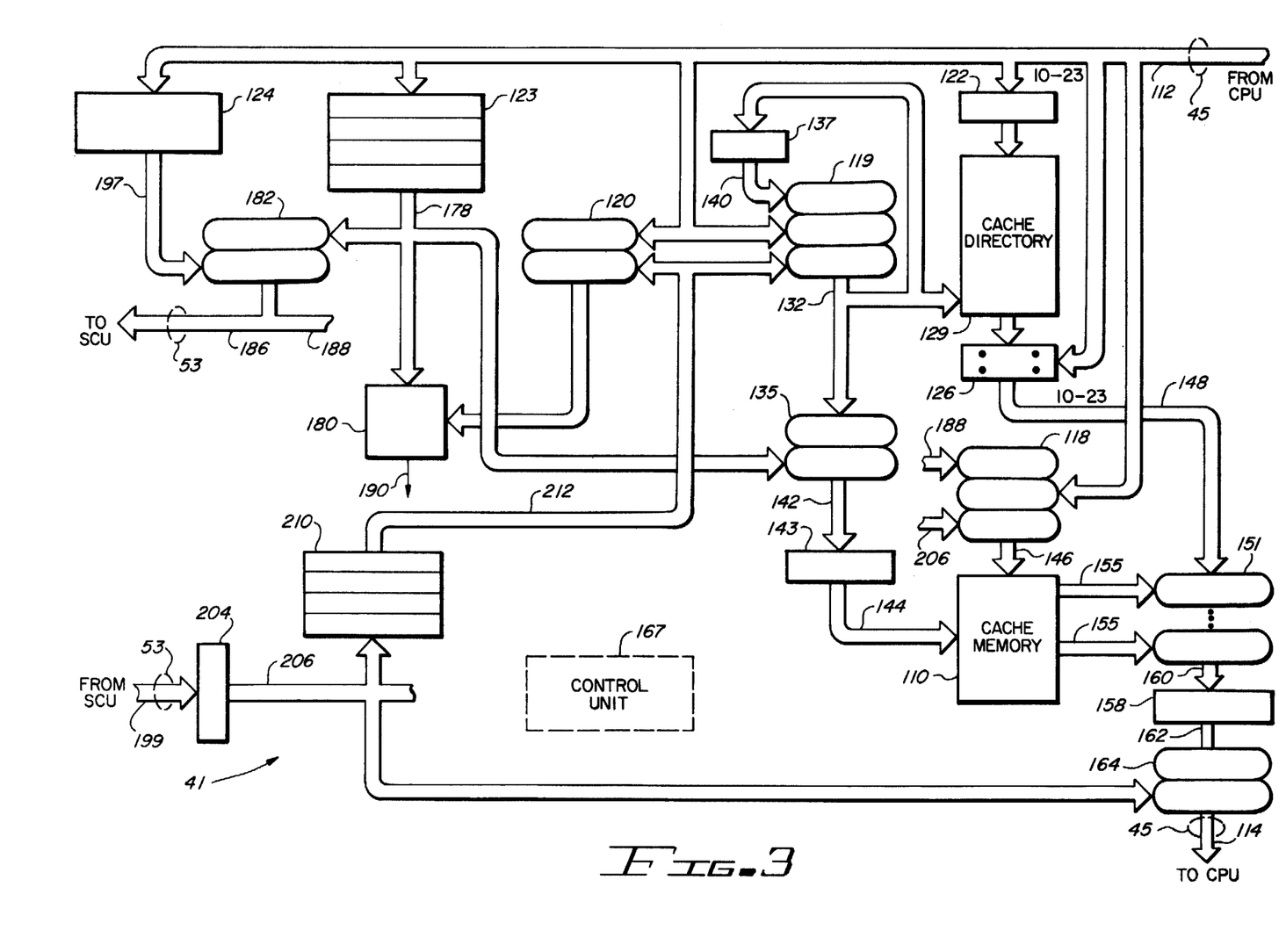
FIG. 3 is a block diagram of a cache unit shown in FIG. 2.

When the central processing unit 37 requests a particular information segment, the request first goes to cache unit 41 through channel 45. Cache unit 41 normally determines if the requested information segment is stored within its memory 110 (FIG. 3). If the information segment is present within the cache memory, the read operation to the main memory is aborted. If the information segment is not contained within the cache memory, the operation continues as discussed above and the information segment is obtained from the main memory 50.

As specified by the central processing unit 37, when the particular information segment requested from the main memory 50 is transferred from the system controller 55 to the cache unit 41, the information segment is both passed on to central processing unit 37 and stored into the cache memory 110 (FIG. 3) within the cache unit 41.

When central processing unit (CPU) 37 issues a write command and provides the address of the storage location within main memory 50 into which the information segment, provided by central processing unit 37, is to be written, the write command can, if central processing unit 37 so indicates, cause cache unit 41 to write the information segment into cache memory 110 (FIG. 3). The write command is then passed to system controller 55 and ultimately to the main memory 50 to be written into the storage location addressed.

Duplicate directory 73 which is associated with cache unit 41 maintains a record of all the storage locations of main memory 50 which have their contents also stored in the cache memory of cache unit 41. Duplicate directory 73 determines whether or not there is a match between the storage location currently being addressed and a storage location indicated as having its information segment also located in cache memory 110 (FIG. 3) of cache unit 41. The particular storage and retrieval methods utilized by the duplicate directory and the cache unit for determining whether or not the particular main memory storage location addressed has its information segment located in the cache memory are similar.

The duplicate directory 73 also receives inputs from the other system controller units 58 and 59 for determining if any of the operations of the central processing unit or if any peripherals passing through the system controller units affect any of the storage locations within main memorh which also have their information segments also stored within cache unit 41. For example, if the system controller unit 58 receives a write command from central processing unit 38 to write into a certain memory location within the main memory, duplicate directories 73 and 75 are notified through channels 79 and 89. The duplicate directories 73 and 75 check their contents to determine if the associated cache units 41 and 43, respectively, contain the information segment present in that particular storage location. If duplicate directory 73 determines that the information segment is located within the cache memory 110 of cache unit 41, a clear command is initiated by the duplicate directory 73 through channel 77. The system controller 55 passes the command through channel 53 to cache unit 41 and that particular information segment is cleared from the cache memory of the cache unit. If duplicate directory 75 determines that cache unit 43 contains the information segment of that particular storage location it also issues a clear command on channel 92 which is passed through system controller unit 59 to the cache unit 43. The particular information segment is cleared from the cache memory (not shown) of cache unit 43.

A similar sequence occurs if the system controller unit 58, as commanded by central processing unit 38, allows a peripheral to read and clear main memory storage locations. Duplicate directories 73, 74, and 75 check each address of the storage locations to determine whether or not cache units 41, 42 and 43, respectively, contain the information segment present in that particular main memory storage location. If duplicate directory 73 determines that the cache memory 110 of cache unit 41 contains the information segment present in that particular main memory storage location, the duplicate directory issues the clear command as discussed above.

Duplicate directories 74 and 75 also issue clear commands if they determine that the associated cache memories (not shown) within cache units 42 and 43, respectively, contain the information segment in that particular memory storage location of the main memory 50. One type of system utilizing duplicate directories as shown in U.S. patent application Ser. No. 968,223 by Crain et al filed on Dec. 11, 1978 and entitled "Apparatus for Selectively Clearing a Cache Store".

Cache unit 41 of FIG. 2 is shown in more detail in FIG. 3. Cache units 41, 42 and 43 (FIG. 2) are similar in nature and a discussion of one shall suffice for all. As shown in FIG. 3, channel 45's input lines 112 from the CPU and the output lines 114 to the CPU are shown separately. The standard timing and other logic command functions in an apparatus of this type are utilized throughout. Therefore, lines other than those 112 and 114 will be present within channel 45. The same is true of the other channels which will be discussed in more detail in connection with FIGS. 3 and 4.

Input lines 112 are connected to data switches 118, 119, and 120, registers 122 through 124, and comparator 126. Data switch 119 receives only the lower portion of the main memory address and provides the address for cache directory 129. Cache directory 129 is a random access memory which is organized on an associative addressing by levels system. The output of data switch 119 is connected through the multiline channel 132 to data switch 135, directory 129, and register 137. Register 137 has its output connected through channel 140 as an input to a data switch 119.

The output of data switch 135 is connected through multiline channel 142 to an address register 143. Address register 143 provides the necessary addressing to cache memory 110 through multiline channel 144. The data to be written into cache memory 110 is provided through multiline channel 146 from data switch 118. Comparator 126 provides an output through channel 148 to data switch 151. Data switch 151 also receives as inputs the outputs of cache memory 110 through a plurality of channels 155. The output of data switch 151 is communicated to register 158 through multiline channel 160. The output of register 158 is connected through multiline channel 162 to a data switch 164. The output of data switch 164 is connected to the output lines 114 to CPU 37 (FIG. 2).

If data is to be written into the cache memory from CPU 37 the address and the command comes through input lines 112. The write command will contain the entire main memory storage location address for the particular information segment to be written into the cache memory. The lower portion of the address specifically bits 24 through 30 are applied through data switch 119 to cache directory 129. The upper portion of the address is applied to comparator 126 and cache memory 110. The information segment to be written into cache memory 110 is applied from input lines 112 through data switch 118 and channel 146 to cache memory 110. The address for the location within the cache memory where the information segment is to be stored is provided by the lower portion of the main memory address through channel 132 data switch 135 channel 142 as stored into register 143.

Cache memory 110 is adapted so that the address provided through channel 144 from register 143 selects a set of eight storage locations for the information segment. The particular one of the eight storage locations (hereinafter referred to as levels) is provided by a round robin counter (not shown) within control unit 167. When the lower portion of the address is applied to the cache directory 129, a set of eight different address tags in eight storage locations within the cache directory are provided as outputs to comparator 126. Comparator 126 determines if any of the set of eight different address tags provided is identical with the upper portion of the main memory address (consisting of bits 10 through 23).

During a standard read operation, the command from CPU 37 enters the cache 41 and the data switch 119 is commanded by control unit 167 to apply the lower portion of the address to cache directory 129 and data switch 135. Data switch 135 is commanded to select the output of data switch 119 by control unit 167. The lower portion of the main memory address is stored into register 143. The output of cache memory 110 is one of eight information segments which pass through channels 155 and are selectable by switch 151.

The selection of one of the eight information segments of the output or switch 151 is made by comparator 126. When the lower portion of the main memory address is applied from switch 119 to the directory 129 the output of the cache directory to comparator 126 is eight address tags, which are the upper portion of the main memory address for the eight corresponding information segments stored into the cache memory 110. A comparison is made by comparator 126 between the upper portion of the main memory address from input lines 112 and each of the address tags provided by cache directory 129. If any of the address tags match the upper portion of the main memory address, the comparator 126 indicates which level is associated with the address tag. The level output to switch 151 causes the switch to select that level, and the correct information segment is loaded into register 158 to be passed through data switch 164 to the CPU 37 (FIG. 2). Data switch 164 is controlled by control unit 167.

In a particular adaptation of the cache directory, the level which the information segment within the cache memory 110 occupies is stored along with the upper portion of the main memory address (or address tag). Also associated with the address tag (or upper portion of the main memory address) are full/empty bits which indicate that the particular address tag corresponds to a valid information segment within the cache memory 110. The commands and the address for the proper storage location within the main memory are not only applied to data switch 119 and comparator 126, but also to a plurality of transient storage registers shown as register 123. Control unit 167 provides the necessary control signals to register 123. It has been found useful to have in certain applications the capability to store four separate read requests. Each register is adapted not only to store the command segment of the read request but also the address within the main memory and the level assigned within cache memory 110 where the information segment read from the main memory is to be stored if the information segment is not contained in the cache memory.

If comparator 126 determines that the information segment is already present in cache memory 110, the read operation is aborted and that particular read request is removed from register 123. Under certain conditions read requests are entered into register 123 while the cache memory in the cache directory performs other functions.

It is sometimes desirable that the lower portion of the address stored within register 123 to applied to data switch 135 through multiline channel 178. The lower portion of the main memory address which is applied through data switch 135 and stored into register 143 from register 123, is utilized to provide the address for cache memory 110 as the data is read back from the main memory through the system controller unit (to be discussed in detail hereinafter).

The output of register 123 is also applied to a comparator 180 and a data switch 182. Data switch 182 which is controlled by control unit 167 has its output applied through output lines 186 of channel 53 to the system controller unit 55 (FIG. 2). The output of data switch 182 is also applied to data switch 118 through multiline channel 188.

Comparator 180 compares the output of data switch 120 to the contents of register 123 to determine if any of the read requests in register 123 are present again on line 112 or if a clear command (to be discussed in detail hereinafter) is received from the system controller unit. The output of comparator 180 to line 190 stops comparator 126 from providing an output in order to prevent an information segment which is to be cleared from being transferred to the CPU 37. Line 190 can also be connected to control unit 167.

Write commands from the CPU are stored into register 124. Control unit 167 can provide the proper control signals for loading the write command into register 124. The output of register 124 is connected to data switch 182 through multiline channel 197. The address of the information segment which is to be stored into the main memory can pass through data switches 119 and 135 and be entered into register 143. The information segments which are loaded can pass through data switch 182 from register 124 and through channel 188 and data switch 118 for entry into cache memory 110. At the same time, the upper portion of the main memory address becomes an address tag and is loaded into cache directory 129 at the level determined by the round robin counter (not shown). The same level is also provided to the cache memory 110 simultaneous therewith. The level is entered into the cache directory along with the address tag and the full/empty bit is set to indicate full.

Under certain conditions it is necessary that the lower portion of the main memory address be stored temporarily prior to utilization of the cache directory in the cache memory. In this event, the lower portion of the main memory address is loaded into register 137 and the output of data switch 119 becomes the output of register 137 at the appropriate time.

The input lines 199 from system controller unit 55 which are a portion of the lines comprising channel 53 are connected to a register 204. The output of register 204 is connected through channel 206 to register 210 and data switches 118 and 164. Thus, data switch 164 can have its output selected between the outputs of either register 158 or register 204. Register 210 stores clear commands from the system controller unit 55. Up to four such commands can be stored into register 210. The clear commands are then applied through multiline channel 212 to data switches 120 and 119. These clear commands assume a priority as controlled by the control unit 167 over the ordinary operations of the cache unit 41. The lower portion of the main memory address is provided through data switch 119 to the cache directory. The full/empty bit of the appropriate address tag within cache directory 129 is set to indicate that the cache memory is empty (i.e., the information segment contained in that particular location within the cache memory no longer represents a valid information segment). As a part of the command stored within register 210, the level of the address tag is provided to cache directory 129 (through lines not shown) and can be routed through the round robin counter to provide the necessary information to locate which of the eight address tags as addressed by the lower portion of the main memory address provided from register 210, is to have its full/empty bit reset.

In an ordinary read command the information segment to be written into the cache memory is provided through channel 206 to cache memory 110 through data switch 118 and the lower portion of the main memory address provided to register 143 either from register 137 or from register 123. The information segment would be written in the cache memory, after it is read from the main memory, when it was not located within the cache memory and the read operation not aborted.

Figure 4:
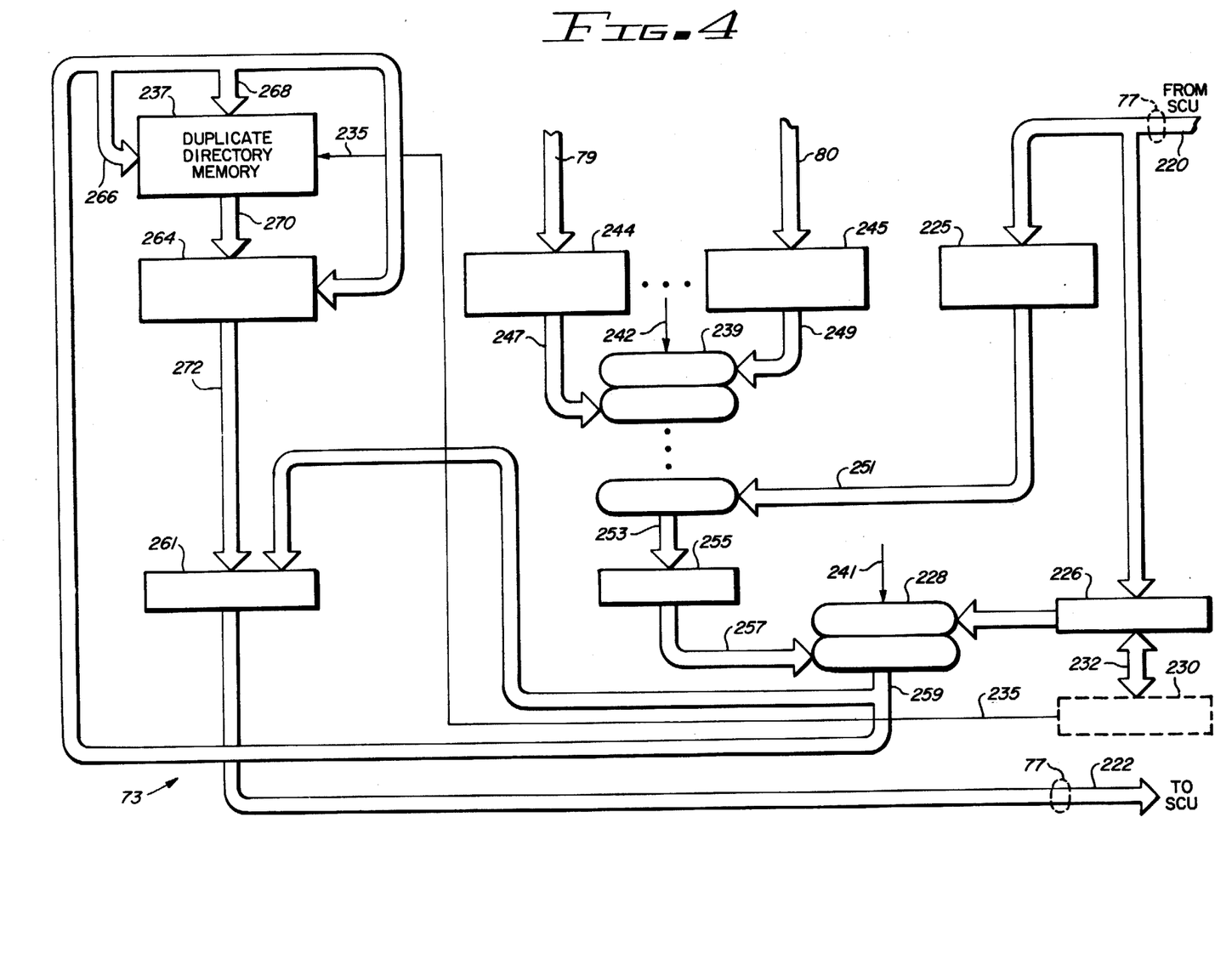
FIG. 4 is a block diagram of a duplicate directory shown in FIG. 2.

Duplicate directory 73 (FIG. 2) is shown in detail in FIG. 4. Duplicate directories 73, 74 and 75 are similar in nature and a detailed discussion of one shall suffice for all. The multiline channel 77 as shown in FIG. 4 comprises input lines 220 from the SCU and output lines 222 to the SCU. The input lines 220 are connected to registers 225 and 226. The read and write commands from central processing unit 37 (FIG. 2), transferred through cache unit 41 and system controller unit 55 enter the duplicate directory from the system controller unit 55 through input lines 220. These commands are also passed to the main memory through channel 69 (FIG. 2).

Register 226 provides as an output the command and the address portion thereof to data switch 228. Directory logic unit 230 examines the command within register 226 through multiline channel 232. The command indicates that information has been written into the cache memory or will be written into the cache memory upon having the information read from memory 50 (FIG. 2). In the event that the command indicates that there has been or will be a change in the cache directory logic unit 129, the directory logic unit 230 issues a set or reset signal through line 235 to the duplicate directory memory 237. Logic unit 230 also operates the data switch 228 and data switch 239 through lines 241 and 242, respectively. If necessary, the read and write commands from the central processing unit can be stored into register 225. Register 225 should be adapted to store more than one command. Read/clear signals from the peripherals through system controller unit 55 can also be stored into register 225.

The read and write commands and clear commands from system controller units 58 and 59 are connected through channels 79 and 80, respectively, to registers 244 and 245, respectively. Registers 244 and 245 should be adapted to store more than one command. The output of register 244 is connected through multiline channel 247 to switch 239, and register 245 is connected to switch 239 through multiline channel 249.

The contents of register 225 are also supplied as an input to data switch 239 through multiline channel 251. The output of data switch 239 is connected through multiline channel 253 to a register 255. The output of register 255 is connected as an input to data switch 228 through multiline channel 257. Thus, any commands from the system controller unit 55 (FIG. 2) can be loaded into register 226 if immediate action is required and that register selected as the output of data switch 228. Alternatively if the commands can pass through register 225 and be selected as the output of data switch 239 to register 255.

The logic unit 230 can also select the output of register 255 as the output of data switch 228. The output of data switch 228 is connected through multiline channel 259 to a register 261, duplicate directory memory 237, and a comparator 264. Only the address of the main memory storage location affected by the command is passed to register 261 to be loaded therein.

The lower portion of the memory address is utilized through channel 266 as the address for the duplicate directory memory 237. The upper portion of the main memory address is applied to the duplicate directory memory 237 through multiline channel 268. The upper portion of the main memory address and the level are applied to the duplicate directory memory for storage therein. The full/empty bit of an address tag is set or reset by logic unit 230 through line 235. The upper portion of the main memory address is also applied to comparator 264. If the duplicate directory memory is being read to determine if a particular address tag is identical to the upper portion of the main memory address on channel 259, eight address tags are applied through multiline channel 270 to comparator 264. Comparator 264 determines if any of the address tags represent the upper portion of the main memory address. If any of the address tags are identical with the upper portion of the main memory address, the level associated with that address tag becomes the output of comparator 264 through multiline channel 272 as an input to register 261. The function of the duplicate directory 73 of FIG. 4 is discussed in detail in connection with FIG. 5. However, a brief example of the operation should be helpful at this time.

Central processing unit 38 generates a write command to a particular address in the main memory. This command passes through cache unit 42 and enters system controller unit 58. System controller unit 58 sends the address of the command and its nature through multiline channel 79 and the command is stored into register 244. At some point the contents of register 244 which represent this write command are loaded into register 255 through switch 239 under the control of logic unit 230. Register 255 is selected as the output of data switch 228 and the address is applied to the duplicate directory memory as discussed above. Assuming that the cache memory 110 contains the information segment which was present prior to this write command, the duplicate directory memory will contain the address tag for that particular memory location and comparator 264 will output the level of that address tag.

It should be noted that comparator 264 also determines if the full/empty bit associated with the address tag which is identical to the upper portion of the main memory address is set. If the full/empty bit is not set the comparator 264 does not send the level to register 261.

If comparator 264 find the address tag and the full/empty bit is set, a clear command is generated by register 261 under the control of the logic unit 230. This clear command contains the necessary code which is recognized as a clear command by cache unit 41 along with the lower portion of the main memory address from register 255 provided through data switch 228 and the level determined by comparator 264. This clear command is passed to system controller unit 55 through output lines 222. System controller unit 55 (FIG. 2) passes the clear command to cache unit 41 through input lines 199. The clear command is recognized by the control unit 167 and is loaded into register 210. The lower portion of the main memory address is applied to cache directory 129 through switch 119 from register 210. The level which is to be cleared supplied through the round robin counter (not shown), for example, and the full/empty bit of the appropriate one of the eight address tags addressed by the lower portion of the main memory address has its full/empty bit reset. The full/empty bit being reset indicates that the information segment contained within cache memory 110 which is associated with particular address tag is no longer valid.

Figure 5:
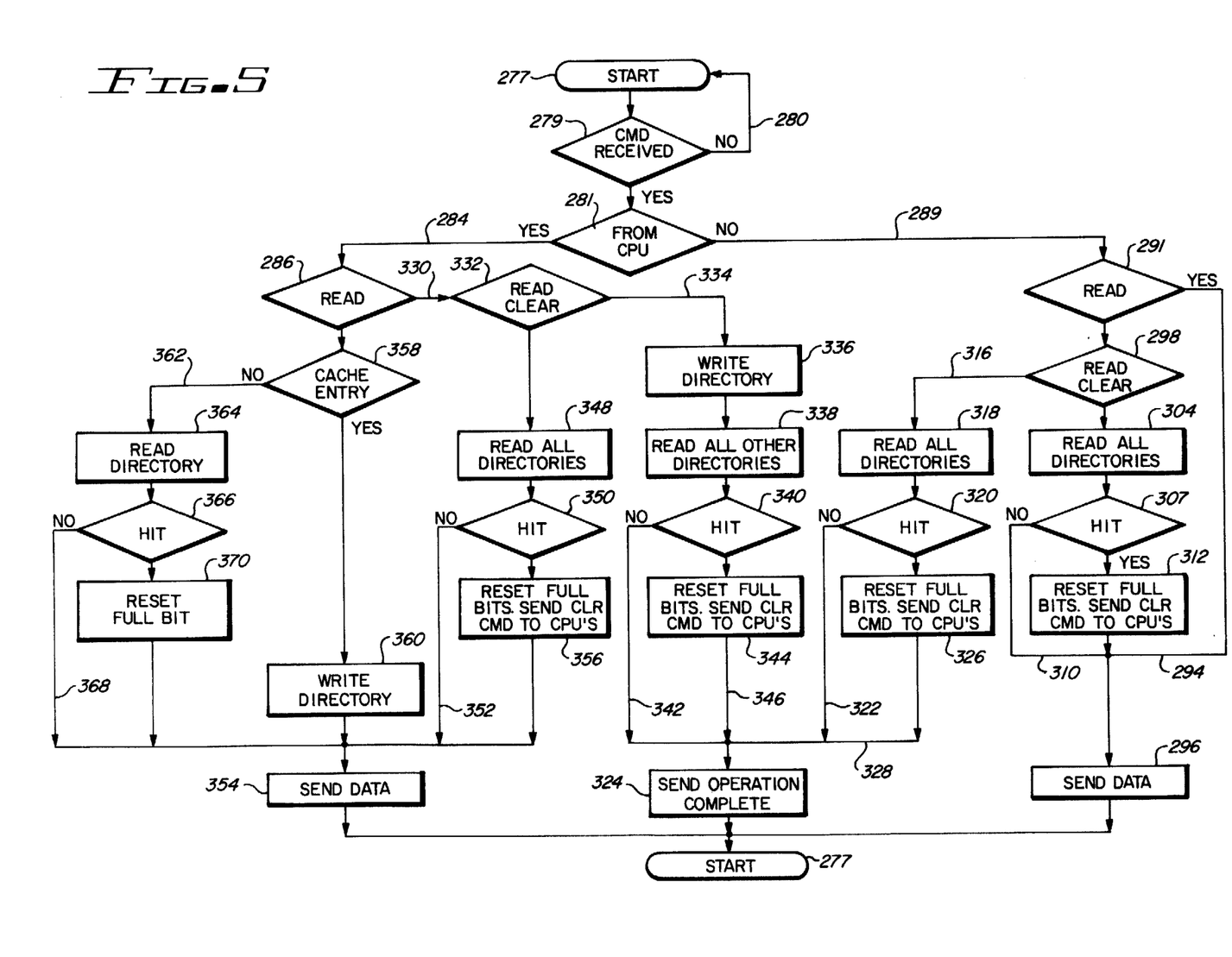
FIG. 5 is a logic diagram of the operation of the duplicate directories shown in FIG. 2.

The operation of duplicate directory 73 and cache unit 41 will be discussed in detail in connection with the following discussion of the logic flow diagram of FIG. 5. The logic, after initalization, enters into logic state 277. The logic passes from state 277 to logic state 279. In logic state 279 a test is made to determine if a command has been received by registers 225, 226, 244 or 245 (FIG. 4). If a command has not been received, the logic cycles through path 280 and re-enters state 277. If a command has been received, the logic received from stae 279 enters state 281.

In state 281 a determination is made whether the command received originated with the associated central processing unit 37. The commands present in registers 244 and 245 are from system controller units 58 and 59, respectively. The commands present in registers 225 and 226 are from system controller unit 55. If the command received is from CPU 37 through system controller unit 55, the logic passes through path 284 and enters into state 286. However, if the determination made in state 281 is that the command originated with central processing units 38 or 39 or one of the peripheral units connected to any of the system controller units 55, 58 or 59, the logic proceeds through path 289 and enters into state 291.

Assuming that the command originated with either central processing unit 38 or 39, or from any of the peripheral devices connected to the system controller units 55, 58, or 59, and the logic is currently within state 291, a determination is made within state 291 if the particular command is a read command. If the command, is a read command the logic proceeds through path 294 and enters into step 296. In step 296 the requested data is sent from the main memory 50 (FIG. 2) to the appropriate system controller unit and from there to the requesting peripheral device or central processing unit. The duplicate directory 73 takes no action.

If the received command is not a read command, logic passes from state 291 and enters state 298. In state 298 the logic determines if this particular command is a read/clear command. If it is a read/clear command, the logic passes from state 298 and enters into step 304. In step 304, the address of the requested information is applied to the duplicate directory memory 237 (FIG. 4). The contents of the duplicate directory memories (not shown) provided in duplicate directories 74 and 75 are also examined. Logic then proceeds from step 304 and enters into state 307.

Within state 307 a test is made to determine whether or not the comparators, such as comparator 264 (FIG. 4), have determined that any of the address tags which were addressed by the lower portion of the main memory address match the upper portion of the main memory address. If the comparator 264, for example, does not locate the address tag within the duplicate directory memory, the logic proceeds through path 310 and enters into step 296. In step 296 the requested information segment is passed from the main memory to the requesting system controller unit and onto either the requesting central processing unit or the requesting peripheral device. If in state 307 the determination by a comparator is made that a match exists between the upper portion of the main memory address and one of the address tags which were addressed by the lower portion of the main memory address, the logic proceeds from state 307 and enters into step 312. While the logic is in step 312, the full/empty bit of the address tag which matches the upper portion of the main memory address is reset to indicate that the corresponding location within the cache memory does not contain a valid information segment.

The level of the address tag which corresponded to the upper portion of the main memory address is sent through channel 272 and enters register 261. Register 261, under the command of logic unit 230, generates a clear command. The address for the lower portion of the main memory address is obtained from register 255 and loaded into register 261. The clear command is then transferred through output lines 222 and input line 199 (FIG. 3), and enters register 204. The clear command in then loaded into register 210 and the full/empty bit addressed by the lower portion of the main memory address and at the level included within the command, as provided by the command, has its full/empty bit reset, indicating that the cache memory 110 location which corresponds thereto does not contain a valid information segment. Logic then proceeds from step 312 and enters into step 296 and the data is sent from the main memory 50 (FIG. 2) to the requesting peripheral device or central processing unit.

If the command examined in state 298 is not a read/clear command, the logic goes to step 318 through path 316. This implies the command is a write command to write an information segment into the main memory 50. In step 318, the duplicate directories 73, 74, and 75 are examined to determine if their associated cable memories contain the information segment which has the main memory address provided by the write command, if the command was issued by a peripheral device. Thus, the lower portion of the main memory address is applied to the duplicate directory memories within duplicate directories 73, 74, and 75.

The logic then proceeds from step 318 to state 320. If the write command is from CPU 42 or 43, the address tag and level are written in to the duplicate directory memories of duplicate directories 74 or 75 respectively in step 318 if any entry was made into the associated cache.

In state 320, the logic examines the outputs of the comparators within duplicate directories 73, 74, or 75, which are similar to comparator 264, to determine if the duplicate directory memories contain an address tag which indicates that the associated cache units 41, 42, and 43, respectively, contain an information segment which corresponds to that main memory address. If an address tag was written into a duplicate directory memory in step 318, the associated comparator is not examined. If it is determined that none of the address tags indicate that the cache memories contain that particular inforation segment, then the logic proceeds through path 322 and enters into step 324. If it is determined that one or more duplicate directory memories within duplicate directories 73, 74, or 75 contains an address tag indicating that the associated cache memory has the information segment affected by the write command, the logic proceeds from state 320 to step 326.

In step 326 the full/empty bit within the duplicate directory memory is reset for the particular address tag and a clear command is sent to the cache unit having that particular information segment stored in its cache memory. Of course, if the duplicate directory memory was written into in step 318, the full/empty bit is not reset in step 326.

From step 326, the logic proceeds through path 328 and enters step 324. In step 324, the write operation is completed in main memory 50 and an operation complete signal is sent to the requesting system controller unit by its associated duplicate directory and by the main memory 50. The operation complete signal can be conveyed through the system controller 55 and cache unit 41 to the central processing unit 37 if desired. The logic then proceeds from step 324 and re-enters state 277.

Assuming, while the logic was in state 281, that the command received was from the central processing unit 37, and the logic flows through path 284, enters into state 286 and proceeds as follows. In state 286 a test is made to determine if the command is a read command. If the command is a read command, the logic proceeds through path 330 and enters into state 332.

In state 332, the read command is again examined to determine if the command represents a read/clear operation. If the command does not represent a read/clear command, the logic proceeds through path 334 and enters into step 336. Under these conditions the command is implied to be a write command. The upper portion of the main memory address is written into the proper location within the duplicate directory memory 237 (FIG. 4) as an address tag utilizing the lower portion of the main memory address on channel 266. The write command includes the level to be associated with the address tags. The full/empty bit is set.

The logic then proceeds from step 336 and enters into step 338. In step 338, the other duplicate directory memories are examined by the duplicate directories 74 and 75 to determine if an address tag exists which corresponds to the upper portion of the main memory address. The address tags examined represent the eight address tags which are transferred to the comparator from the duplicate directory memory when addressed by the lower portion of the main memory address. The logic then proceeds from step 338 and enters into state 340.

In state 340, a test is made to determine if the comparators within duplicate directories 74 and 75 have identified any of the address tags provided to the comparator by the duplicate directory memory as identical to the upper portion of the main memory address.

If none of them has shown a correspondence, i.e., none of the address tags are identical with the upper portion of the main memory address, the logic proceeds through path 342 and enters step 324 and the logic proceeds as discussed above. If the comparators within duplicate directories 74 and 75 determine that an address tag is identical with the upper portion of the main memory address, the logic proceeds from state 340 and enters into step 344. In step 344, as in step 326, the clear commands with the lower portion of the main memory address and the level provided by the comparator are sent to the appropriate CPU, 38 or 39. The logic then proceeds through the path 346 and enters step 324.

If, while the logic is in state 332, it is determined that this is a read/clear command, the logic proceeds to step 348. In step 348, all of the duplicate directories are examined to determine if any duplicate directory memory (only duplicate directory memory 237 for duplicate directory 73 (FIG. 4) is shown) contains an address tag corresponding to the address provided by the command.

In state 350, which follows step 348, the output all the comparators (only comparator 264 of duplicate directly 73 is shown) are examined to determine if any of the address tags are identical with the upper portion of the main memory address provided within the command. The address tags provided to the comparator are only those addressed by the lower portion of the main memory address. If none of the address tags match the upper portion of the main memory address, the logic proceeds from state 350 through path 352 and enters into step 354. In step 354, the requested data is set to CPU 37 (FIG. 2) by the main memory 50 through system controller unit 55.

If it has been determined that one of the address tags does match the upper portion of the main memory address, the logic proceeds from state 350 and enters step 356. In step 356, the full/empty bit of that address tag is reset and the clear command is sent to the cache unit of the associated CPU. The logic then proceeds from step 356 and enters into step 354. From step 354, the logic re-enters state 277 and proceeds as discussed above.

If, while the object is in state 286, it is determined that the command received from the CPU 37 is a read command, the logic proceeds and enters into state 358. In state 358, the command is examined to determine if an entry is to be made into the cache memory 110. If the information segment addressed within the main memory 50 (FIG. 2) is to be written into the cache memory 110 (FIG. 3), the logic proceeds from state 358 and enters step 360. In step 360, the upper portion of the main memory address is written into duplicate directory memory 237 as an address tag along with the level provided by the read command within the duplicate directory memory 237 (FIG. 4). From step 360 the logic proceeds to step 354 and proceeds as discussed above.

If during step 358 it is determined that an entry is not to be made into the cache memory 110 (FIG. 3), the logic proceeds through path 362 and enters into step 364. In step 364, duplicate directory memory 237 has the lower portion of the main memory address of the information segment to be read applied through channel 266. The comparator 264 examines the address tags received from duplicate directory memory 237 to determine if any of the address tags are identical with the upper portion of the main memory address. The logic proceeds and enters into state 366 from state 364. If within state 366, it is determined that none of the address tags match the upper portion of the main memory address, the logic proceeds from state 366 through path 368 and enters into step 354. The logic then proceeds as discussed above. If comparator 264 determines that an address tag is identical with the upper portion of the main memory address, the logic proceeds to step 370. Within step 370, the full/empty bit of that address tag is reset. It should be noted that the corresponding full/empty bit of cache directory 129 has previously been reset. The logic then proceeds from step 370 and enters into step 354 and the operation of the duplicate directory and the cache memories continuous as discussed above.

Whereas the present invention has been described in particular relation to the drawings attached hereto, it should be understood that other and further modifications, apart from those shown or described herein, may be made within the spirit and scope of this invention.

what is claimed is:

1. In a computer system including a main memory, a first number of central processing units (CPUs), a first number of cache memory units, each connected to a different one of said CPUs for storing selected main memory words and associated main memory addresses for use by the connected CPU, and a first number of system controller units (SCUs) each connected to a different one of said cache memory units to control the flow of commands and data between said cache memory units and said main memory, all of said SCUs being in direct communication with each other and with said main memory, a first number of duplicate directories each corresponding to a different one of said cache memory units and each being connected to receive main memory addresses and memory command addresses generated by said CPUs and sent through their connected cache memory units and SCUs, each of said duplicate directories comprising:

(a) means of storing the main memory addresses also stored in said corresponding cache memory units;
(b) means of storing memory command addresses sent from said SCUs;
(c) means for selecting one address from said memory command address storing means;
(d) means for comparing said one selected memory command address to main memory addresses in said main memory address storing means and for generating a clear signal indicating that said main memory address storing means contains an address which is the same as the memory command address selected by said address selecting means; and
(e) means for invalidating an address in said main memory address storing means which is the same as said one selected memory command address and for transmitting said clear signal to the SCU connected to said corresponding cache memory unit thereby to cause said corresponding cache memory unit to invalidate the main memory address in said corresponding cache memory unit which is the same as said one selected memory command address.

2. The duplicate directory in claim 1 wherein said main memory address storing means includes validity indicators for each main memory address in said main memory storing means, and wherein said invalidating and transmitting means sets the validity indicator for a main memory address to be invalidated.

3. A computer system comprising:
(a) a main memory;
(b) a first number of central processing units (CPUs);
(c) a first number of cache memory units each connected to a different one of said CPUs for storing main memory words and associated main memory addresses for use by the connected CPU;
(d) a first number of system controller units (SCUs) each connected to a different one of said cache memory units to control the flow of commands and data between said main memory and the corresponding cache memory unit, all of said SCUs being in direct communication with each other and with said main memory and each outputting memory command addresses generated by said CPUs and received through the corresponding cache memory units; and
(e) a first number of duplicate directories each corresponding to a different one of said cache memory units and each being connected to all of said SCUs, said duplicate directories storing main memory addresses corresponding to said main memory addresses in the corresponding cache memory units and indicating to the corresponding cache memory units which of said main memory words stored in said corresponding cache memory unit contain valid data.

4. The computer system in claim 3 wherein each of said duplicate directories includes means for receiving from said SCUs memory command addresses, means for determining whether said memory command addresses in said receiving means are the same as addresses contained in said corresponding cache memory unit, means for causing the corresponding cache memory unit to invalidate a main memory address in the corresponding memory cache unit which is the same as a memory command address in said receiving means.

5. The computer system in claim 4 wherein said receiving means in said duplicate directories includes priority address means for storing addresses from said SCU connected to said corresponding cache memory units, said addresses being used by said determining means before other addresses in said receiving means.

6. In a computer system including a main memory, a first number of central processing units (CPUs), a first number of cache memory units each connected to a different one of said CPUs for storing selected main memory words and associated main memory addresses for use by the connected CPU, and a first number of system controller units (SCUs) each connected to a different one of said cache memory units to control the flow of commands and data between said cache memory units and said main memory, all of said SCUs being in direct communication with each other and with said main memory, a first number of duplicate directories each corresponding to a different one of said cache memory units and each being connected to receive main memory addresses and memory command addresses generated by said CPUs and sent through their connected cache memory units and SCUs, each of said duplicate directories comprising:

(a) means for storing the main memory addresses also stored in said corresponding cache memory unit;

(b) means for storing memory command addresses sent from said SCUs;

(c) priority address means for storing memory command addresses from said SCU connected to said corresponding cache memory unit, said memory command addresses stored in said priority address means being generated by the CPU connected to said corresponding cache memory unit;

(d) means for selecting one address from either said memory command address storing means or said priority address storing means, said address selecting means giving priority to said addresses in said priority address means before selecting addresses from said memory command address storing means;

(e) means for comparing said one selected memory command address to main memory addresses in said main memory address storing means and for generating a clear signal indicating that said main memory address storing means contains an address which is the same as the memory command address selected by said address selecting means; and (f) means for invalidating an address in said main memory address storing means which is the same as said one selected command address and for transmitting said clear signal to the SCU connected to said corresponding cache memory unit thereby to cause said corresponding cache memory unit to invalidate the main memory address in said corresponding cache memory unit which is the same as said one selected memory write command address.

* * * * *